Patented Apr. 5, 1938

2,113,090

UNITED STATES PATENT OFFICE 2,113,090

LUMINESCENT MATERIAL

Alfred H. McKeag and John T. Randall, Middlesex, England, assignors to General Electric Company, a corporation of New York No Drawing. Application June 3, 1937, Serial No. 146,208. In Great Britain April 28, 1936

6 Claims. (Cl. 91—70)

This invention relates to luminescent materials. It relates more particularly to the manufacture of materials adapted to be excited to luminescence by the radiation from an electric discharge, wherein rhodamine or like organic dye is the primary component.

In the manufacture of electric discharge lamps rhodamine might be expected to have extensive application, for it emits red luminescent radiation in which certain discharge lamps, and especially high-pressure metal-vapor discharge lamps, are apt to be deficient. However, the use of rhodamine has been restricted because as heretofore employed it has not proved to be "light-fast".

A principal object of the present invention is to produce a light-fast luminescent material of which rhodamine, or one of the known organic dyes having the same or equivalent properties as rhodamine, is the primary component.

Pure solid rhodamine exhibits little luminescence. It luminesces only when it is dispersed in a suitable medium. This medium may be a liquid solvent such as acetone; but, in association with electric discharge tubes, it is more often a solid resinous material. The resin and the rhodamine are usually dissolved in a common solvent of complicated composition, and the solid luminescent material is obtained by evaporation of the solvent. Such material may have a high initial luminescence; but the luminescence fades rapidly on exposure to strong light, that is to say, it is not "light-fast".

We have found that the initial luminescence may be somewhat, and the light-fastness greatly, improved if a small amount of the rhodamine or equivalent substance is uniformly dispersed in a relatively simple synthetic resin by stirring solid rhodamine in finely divided or powdered state into the molten resin without the addition of any solvent. Resins of the polyhydric alcohol-polybasic acid type or, more specifically, resins of the glycerine-phthalic anhydride type, are suitable for use. Resins of the urea-formaldehyde type and substances such as cellulose acetate and the like are, generally speaking, somewhat less suitable. We have obtained best results with the resins sold by Imperial Chemical Industries, Ltd., under the trade names of Paralac 1001, Paralac 1101, and Paralac 1201. These resins are polyhydric alcohol-polybasic acid resins without any other additives and they are characterized in that they do not react photochemically to an appreciable extent with rhodamines. The melting point of Paralac 1001 is about between 68° C. and 84° C. and its acid value varies from 160 to 190. The melting point of Paralac 1101 is about between 95° C. and 105° C. and its acid value varies from 130 to 160. Paralac 1201 has a melting point of about 110° C. and an acid value about 125.

The ratio of rhodamine, or other organic dye substance having properties in common with rhodamine, to resin preferably ranges from 1 part by weight of rhodamine to from about 100 to 200 parts by weight of resin.

According to the invention the manufacture of a material adapted to be excited to luminescence by the radiation from an electric discharge comprises the step of mixing solid rhodamine, or like or equivalent organic dye substance, with a molten resin in the absence of any solvent adapted to dissolve both the dye and the resin. It appears that the rhodamine dye dissolves in the resin to form the resulting luminescent composition.

When luminescent materials, in which rhodamine or the like is the primary component, are associated with high-pressure metal-vapor discharge devices, they are generally applied to surfaces (for example, to those of a reflecting fitting) other than the envelope of the device. The supporting or backing member for the luminescent composition may comprise, for example, such substances as metals, for instance, aluminum, nickel, chromium, steel, etc., the surfaces of which are opaque and such as to produce diffused reflection when light is projected on them (that is to say, light diffusing) or substances having the same opaque and diffusing characteristics described with reference to metals, for example, special glasses and porcelain.

The best way to coat such surfaces with materials produced in accordance with the present invention is to apply the material in a molten state to a surface of the support, which surface, preferably, has been heated previously to a temperature of, for instance, about 200° C. Alternatively, the compositions of the invention may be allowed to melt in contact with such heated surface. The coated member is then cooled to harden the coating thereon. In either case the luminescent composition will adhere to the cooled surface. An efficient light-transforming screen or reflector results.

What we claim as new and desire to secure by Letters Patent of the United States, is:—

1. A method of making a light-transforming screen or reflector which comprises dispersing in the absence of a solvent a finely divided rhodamine dye in a normally solid meltable synthetic resin capable of forming with such dye a meltable composition adapted to be excited to luminescence in its solidified state by radiation from an electric discharge, and coating a light-diffusing surface with the resulting dyed meltable composition.

2. A method of making a light-transforming screen or reflector which comprises dispersing in the absence of solvents a finely divided rhodamine dye in a normally solid meltable synthetic resin capable of forming with such dye a meltable composition adapted to be excited to luminescence by radiation from an electric discharge, applying the dyed composition in molten state to a light-diffusing surface so as to form a coating of the said composition thereon, and solidifying said coating.

3. A method of making a light-transforming screen or reflector which comprises mixing a small amount of a finely divided rhodamine dye with a molten polyhydric alcohol-polybasic acid resin, applying the resulting composition in molten state to a preheated light-diffusing backing member, and allowing the coated member to cool to harden the coating thereon.

4. A method of making a light-transforming screen or reflector which comprises heating a light-diffusing surface of a backing member, coating said heated surface with a normally solid meltable composition consisting of rhodamine dye dispersed in the absence of a solvent in a meltable synthetic resin capable of forming with said dye a meltable composition adapted to be excited to luminescence by radiation from an electric discharge, and cooling the coated heated surface to harden the coating.

5. A method of making a light-transforming screen or reflector which comprises heating a light-diffusing surface of a backing member, coating said heated surface with a normally solid meltable composition adapted to be excited to luminescence by radiation from an electric discharge, said composition consisting of rhodamine dye dispersed in the absence of a solvent in a meltable polyhydric alcohol-polybasic acid resin, and allowing the coated heated surface to cool to harden the coating.

6. A method of making a light-transforming screen or reflector which comprises heating a light-diffusing backing member to a temperature of about 200° C., coating said heated member with a molten composition consisting of rhodamine dye and polyhydric alcohol-polybasic acid resin in the ratio of 1 part of said dye to from about 100 to 200 parts by weight of said resin, and hardening the applied coating.

ALFRED H. McKEAG.
JOHN T. RANDALL.